(12) United States Patent
Waggoner

(10) Patent No.: US 6,533,529 B2
(45) Date of Patent: Mar. 18, 2003

(54) ADJUSTABLE CONNECTOR FOR EXCAVATOR TOOL ATTACHMENT

(75) Inventor: Allen A. Waggoner, Salinas, CA (US)

(73) Assignee: Morrow & Waggoner, Inc., Turlock, CA (US)

( * ) Notice: Subject to any disclaimer, the term of this patent is extended or adjusted under 35 U.S.C. 154(b) by 0 days.

(21) Appl. No.: 09/942,086

(22) Filed: Aug. 28, 2001

(65) Prior Publication Data

US 2002/0021960 A1 Feb. 21, 2002

Related U.S. Application Data

(63) Continuation-in-part of application No. 09/277,467, filed on Mar. 26, 1999, now Pat. No. 6,318,952.

(51) Int. Cl.[7] .................................................. E02F 3/00
(52) U.S. Cl. ........................ 414/723; 248/200; 403/4
(58) Field of Search ........................... 414/723; 403/3, 403/4, 332, 322.1; 248/200

(56) References Cited

U.S. PATENT DOCUMENTS

| | | | |
|---|---|---|---|
| 1,844,385 A | 3/1932 | Goldsmith | 414/745.4 |
| 2,881,928 A | 4/1959 | Morris | 214/1 |
| 3,561,615 A | 2/1971 | Forsberg | 414/745 |
| 3,834,566 A | 9/1974 | Hilfiker | 215/138 |
| 3,958,704 A | 5/1976 | Wire et al. | 214/130 |
| 3,989,150 A | 11/1976 | Stephenson et al. | 214/147 G |
| 4,682,912 A | 7/1987 | Henry | 405/154 |
| RE32,532 E | 10/1987 | Sonerud | 414/747 |
| 4,890,974 A | * 1/1990 | Kistner | 172/272 |
| 4,934,897 A | 6/1990 | Anderson et al. | 414/694 |
| 5,232,502 A | 8/1993 | Recker | 118/317 |
| 5,387,047 A | * 2/1995 | Korpi | 172/272 |
| 5,522,699 A | 6/1996 | Smith | 414/745.4 |
| 5,549,049 A | * 8/1996 | Deandrea | 104/111 |
| 5,688,009 A | 11/1997 | Pienta | 294/67.2 |
| 5,707,175 A | 1/1998 | Geelhoed | 414/745.4 |
| 5,927,665 A | * 7/1999 | Grabnic | 172/272 |
| 6,318,952 B1 | * 11/2001 | Waggoner | 294/67.2 |

* cited by examiner

Primary Examiner—Eileen D. Lillis
Assistant Examiner—Michael J. Kwon
(74) Attorney, Agent, or Firm—David Jaffer; Pillsbury Winthrop LLP

(57) ABSTRACT

An adjustable coupling connector apparatus for accommodating a range of mating excavator couplers. The connector apparatus includes two parallel bars upon which an excavator coupler clamps. One of the bars is fixed in position to risers extending from a connector base. Each end of the other bar is attached to a point off center of a circular plate so that as the plate is rotated, the bar moves laterally relative to the bar axis. The plates are rotatably positioned in holes in the risers, and captivating side plates are welded to the risers for covering a portion of each plate, securing the plates from movement parallel to its axis but allowing the plate to rotate. Holes in the circular plates and side plates are provided, and a bolt is placed through each of the side plates and circular plates for securing each circular plate in a fixed position.

3 Claims, 9 Drawing Sheets

SECTION A

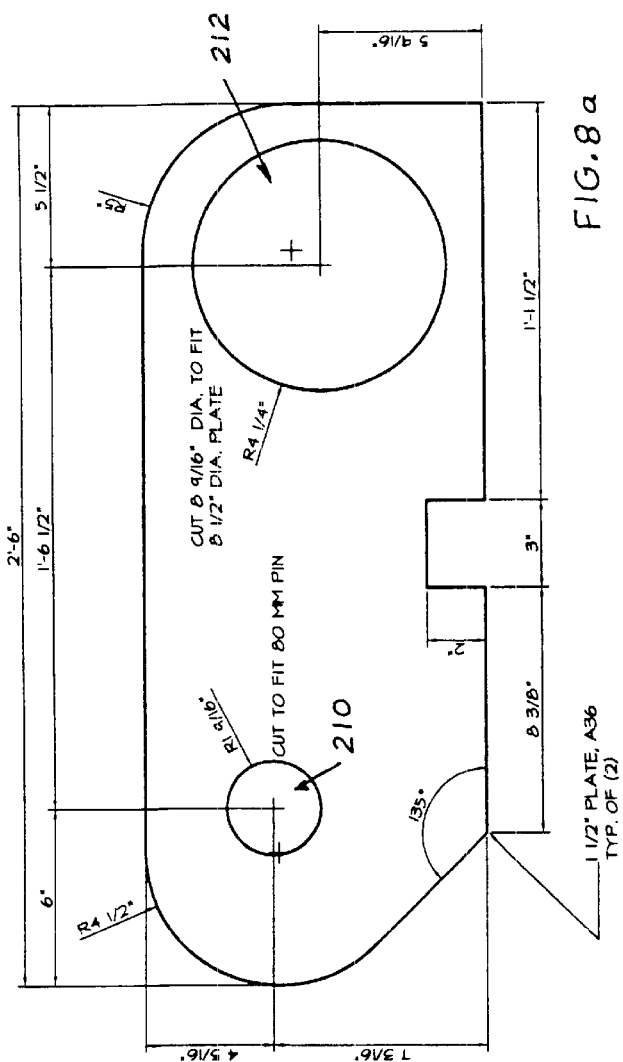
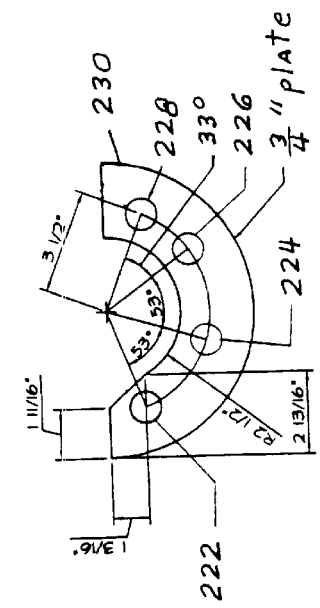
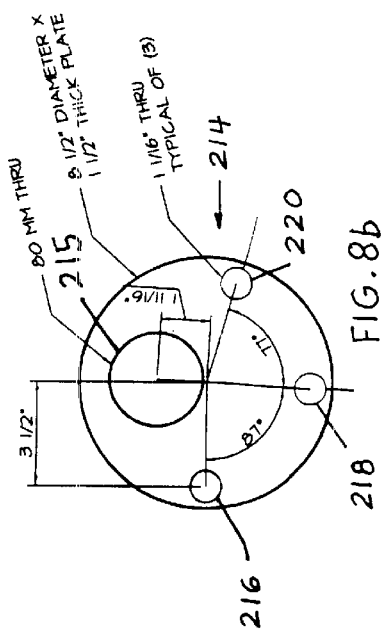
FIG. 8a
FIG. 8b
FIG. 8c

ADJUSTABLE CONNECTOR FOR EXCAVATOR TOOL ATTACHMENT

This application is a continuation-in-part of U.S. patent application Ser. No. 09/277,467 filed Mar. 26, 1999 now U.S. Pat. No. 6,318,952 patented Nov. 20, 2001, the disclosure of which is incorporated herein by reference.

BACKGROUND OF THE INVENTION

1. Field of the Invention

The present invention relates generally to trench digging and pipe laying equipment, and more particularly to an adjustable coupling connector for use in attaching equipment to an excavator, wherein the equipment includes a pipe laying tool and a compaction wheel.

2. Brief Description of the Prior Art

The process of laying sections of pipe for an underground pipe line involves first digging a trench to the required depth with a shovel attached to an excavator. The shovel is then removed from the excavator and a pipe laying tool is attached to the excavator for lowering the pipe into the trench. The pipe laying tool is then removed from the excavator and replaced with a shovel for use in depositing the required filler over the pipe. The shovel is then removed and a compaction wheel is attached for compacting the filler. Various methods of attaching the shovel, compaction wheel and pipe laying tool to the excavator are used. At the present time there is no standard connector for attaching tools to an excavator. If the excavator can accommodate the compaction wheel but not the pipe laying tool, the pipe may be secured to an end of an arm or boom of the excavator with chains and chokers. A disadvantage of this method is that it is necessary to place a worker in the trench to guide the newly lowered section of pipe into contact with a previously installed section. The worker must also disengage the chains, etc. from the pipe. The task of manipulating the pipe in the trench is not without some hazard, due in part to the weight of the pipe and excavator arm. In deep trenches, the additional hazard of possible collapse of the trench walls must be carefully guarded against for the safety of the trench worker. In cases where there is danger of wall collapse, shoring is often put up in place to support the soil. The shoring must then be removed and reinstalled for the process of laying the next section or sections of pipe, etc.

U.S. Pat. No. 5,232,502 by Recker describes an apparatus designed to lay pipe with an excavator without the need for a worker in the trench. A horizontally positioned arm 78 is suspended from the working end of an excavator boom assembly, attached with a rotary coupler 76 (FIG. 2 and col. 3, lines 3–32). In order to avoid the need for a worker in the trench to apply pipe sealant, a sealant is forced through the rotary coupler and sprayed from the end of the horizontal arm. The apparatus as described has some disadvantages and is not in common use. The rotary couple with conduit is not a standard quick coupler, and requires special modification of the excavator. Connecting the horizontal arm 78 and conduit requires a second worker, or alternatively the excavator operator has to leave the cab to manually perform the operation. Positioning the arm 78 and support beam 80 in the process of connecting the tool to the excavator arm assembly is also a problem due to the weight of the tool, and the fact that without other support, the tool could only lay on the ground, 90 degrees disoriented, requiring an operator, probably with additional equipment to lift it into position for connecting to the excavator coupling device 70. In addition, the rotary connection 76 is not durable enough to withstand repeated use, or rigid enough to allow undesired rotation of a pipe placed on the arm 78. For example, a typical eight foot section of 54 inch diameter concrete pipe weighs about 1,370 pounds per foot, or a total of 10,960 pounds. A much more rigid and strong connection is required for practical use.

It is apparent that an improved tool and method of laying pipe is needed that keeps workers out of the pipe trench, and that is robust and can be used with a standard excavator arm quick coupling device. It is also apparent that a coupling device is needed that can accommodate a range of different excavator coupling apparatus.

SUMMARY

It is therefore an object of the present invention to provide a connector that can be adjusted for a range of sizes of excavator coupling apparatus.

It is an object of the present invention to provide a tool for use in lowering a section of pipe into a trench that avoids the use of chains and chokers that must be removed by a trench worker.

It is another object of the present invention to provide a tool for laying pipe that is rugged in construction and that can be attached to the working end of an excavator boom assembly by an excavator operator without leaving the excavator cab.

It is a further object of the present invention to provide a tool that facilitates the joining of pipe sections without the need for a trench worker.

Briefly, a preferred embodiment of the present invention includes an adjustable connector for accommodating a range of mating excavator couplers. The adjustable connector includes two parallel bars to which the excavator coupler clamps. One of the bars is fixed in position to risers extending from a connector base. Each end of the other bar is attached to a point off center of a circular plate so that as the plate is rotated, the bar moves laterally relative to the bar axis. The plates are rotatably positioned in holes in the risers, and captivating side plates are welded to the risers for covering a portion of each plate, securing the plates from movement parallel to its axis but allowing the plate to rotate. Holes in the circular plates and side plates are provided, and a bolt is placed through each of the side plates and circular plates for securing each circular plate in a fixed position.

An advantage of the adjustable connector apparatus of the present invention is that it can accommodate a range of excavator coupler sizes.

An advantage of the tool of the present invention is that it allows a pipe to be positioned in a trench with improved accuracy.

A further advantage of the tool of the present invention is that it allows a pipe supported by the tool to be joined to another pipe in a trench without the need for a trench worker.

A still further advantage of the present invention is that it reduces worker injury by avoiding the need for a worker in the trench during the pipe laying operation.

Another advantage of the present invention is that it provides a pipe laying tool that is self supporting, and does not require an excavator operator to leave the excavator cab to connect the tool.

IN THE DRAWING

FIG. 8a is a planar view of the riser plates of the adjustable connector of FIG. 6;

FIG. 8b is a planar view of the circular end plates of FIG. 6;

FIG. 8c is a planar view of the side plates of FIG. 6; and

DETAILED DESCRIPTION OF THE PREFERRED EMBODIMENT

Figure 1:
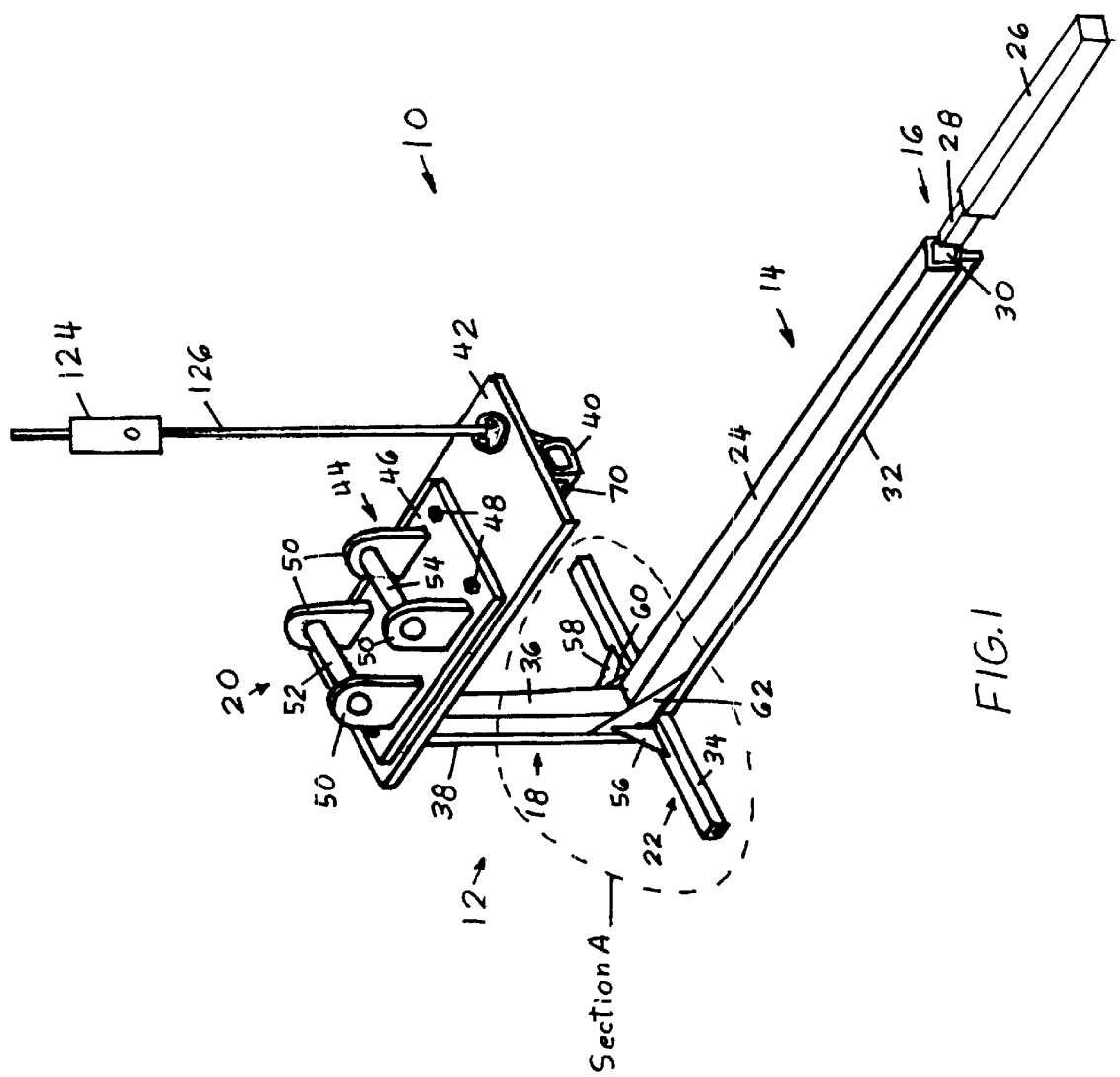
FIG. 1 is a perspective view of the pipe laying tool of the present invention.
Figure 2:
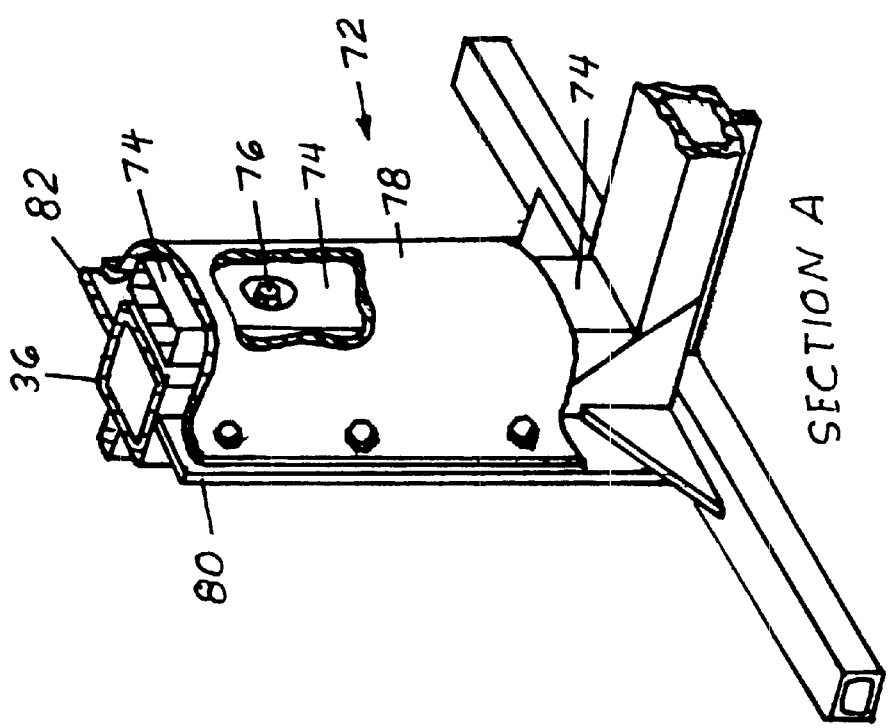
FIG. 2 shows an absorptive bumper mounted to a riser.

The preferred embodiment of the pipe laying tool 10 of the present invention is shown in the perspective views of FIGS. 1 and 2. Referring to FIG. 1, the tool 10 has a proximal end 12, to which is attached a horizontal tool arm 14 extending horizontally in operation to a distal end 16. The arm 14 is connected at the proximal end of the tool to a vertical riser 18, in turn attached to a coupling assembly 20. A lateral support 22 allows the tool 10 to stand unsupported, facilitating the process of connecting the tool to a working end of an excavator arm.

As shown in FIG. 1, the arm 14 includes a length 24 of 4×4 inch×0.5 inch rectangular tubing about 6 feet long. The length can be longer or shorter depending on the length of pipe to be installed. Optionally, as an alternative embodiment, a pipe extension 26 is included in the tool 10. The extension has a reduced size section 28 for insertion in the hollow center 30 of tube 24 for use in accommodating somewhat longer pipe. A 1.25×2.0 inch bar 32 is welded to the bottom of the tube 24 for increased strength, and extends over the majority of the arm 14 length to the lateral support 22 including a stabilization bar 34, constructed from a 30 inch length of 2.0×2.0×0.25 inch wall tubing. The riser 18 is similarly constructed from a 28 inch length of 4×4×0.5 inch tubing 36, braced with a 34 inch long piece of 0.75×5.0 inch flat bar 28.

A support bar 40 of 4×4×0.5 inch tubing by 51.5 inches long is welded to the top end of riser tube 36, and provides strength to the coupling assembly 20. A 1.5 inch thick support plate 42, measuring about 24 inches wide by 27 inches long is welded to the tube 40. The coupling assembly 20 includes a coupling connector 44 with a connector plate 46 secured to support plate 42 with bolts 48 or by welding, and supports 50 for positioning coupling bars 52 and 54.

Figure 3:
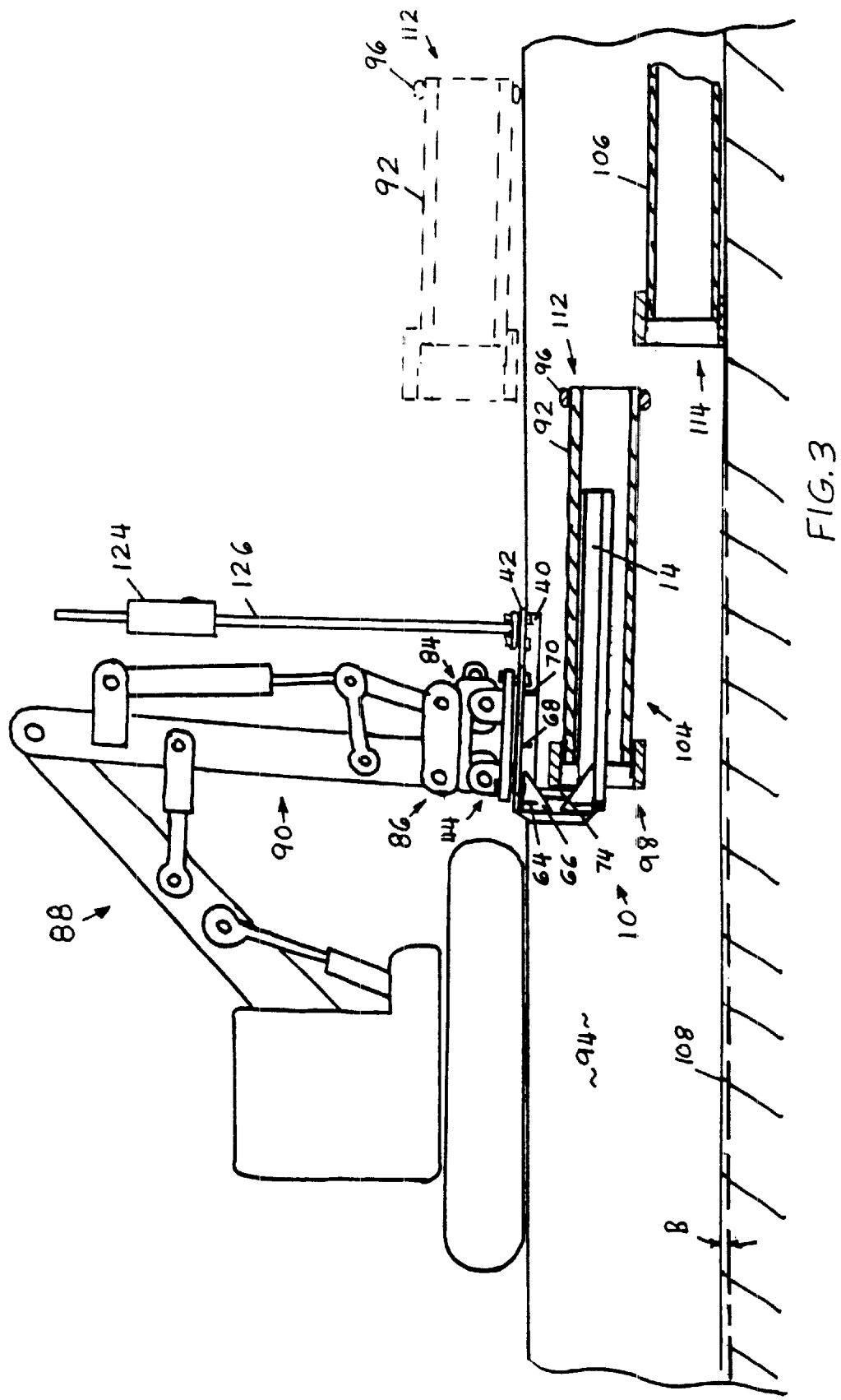
FIG. 3 illustrates the use of the tool to place a pipe in the trench.

The various elements 24, 34, 36, 40, and 42 described above are welded together along with triangular support members 56, 58, 60, 62 for strength. Similarly, triangular support members 64, 66, 68 and 70, shown in FIG. 3, and corresponding supports on the opposite side of tube 40 are welded between plate 42 and tube 40, and between tube 40 and tube 36 as shown in FIGS. 1, 2 and 3. A laser receiver 124 and pole 126 are shown mounted to plate support 42. The function of this apparatus will be fully explained in the following description in reference to FIG. 4.

In order to minimize the probability of damaging the pipe while applying horizontally directed force to engage one section of pipe with another, an absorptive bumper 72 is attached to the riser tube 36 facing the distal end 16. The bumper apparatus is illustrated in section A of FIG. 2. The bumper 72 preferably includes a 2×4 inch board 74 attached to riser tube 36 with bolts 76, countersunk into the board 74 as shown in FIG. 2. In order to further cushion the end of the pipe, a rubber sheet 78 is placed over the board 74 as shown in FIG. 2. The sheet 78 is bolted to two plates 80, 82 welded with one on each side of riser tube 36. The bumper assembly, including plates 80 and 82 are part of the tool of FIG. 1 but not shown in that figure for the purpose of clarity of illustration.

Alternative construction methods and materials will be apparent to those skilled in the art, and these are included in the spirit of the present invention. For example, the rectangular tubes shown in FIGS. 1 and 2 could be constructed from round tubing or I-beam shaped material. The supports to be described could alternatively be tubular lengths of material, or even omitted if enough strength is otherwise designed into the structure. The coupling assembly 20 could include a single piece platform welded to the riser 18.

Referring now to FIG. 3, the tool 10 is shown with the connector 44 engaged with a corresponding mating connector 84 attached to the working end 86 of excavator 88 arm assembly 90. In operation, the tool 10 is attached to the working end 86 of excavator 88. Any time prior to moving a section of pipe such as 92 (dashed lines) into the trench 94 as shown in FIG. 3, a gasket 96 is placed on the pipe spigot end 112. The excavator 88 is then operated to insert the tool arm 14 inside the length of pipe 92 as it lays outside the trench 94. FIG. 3 then shows the pipe 92 at position 104, being lowered down into the trench 94. Lowering and positioning of the pipe 92 continues until the pipe 92 is in alignment with a previously laid section of pipe, such as 106 on the bottom 108 of the trench 94. The positioning then includes joining the pipe section 92 to the previously laid section of pipe 106. The bumper 72 provides a cushioned contact against the end 98 of pipe 92 as the end 112 of pipe 92 is inserted into the adjoining end 114 of pipe 106.

Figure 4:
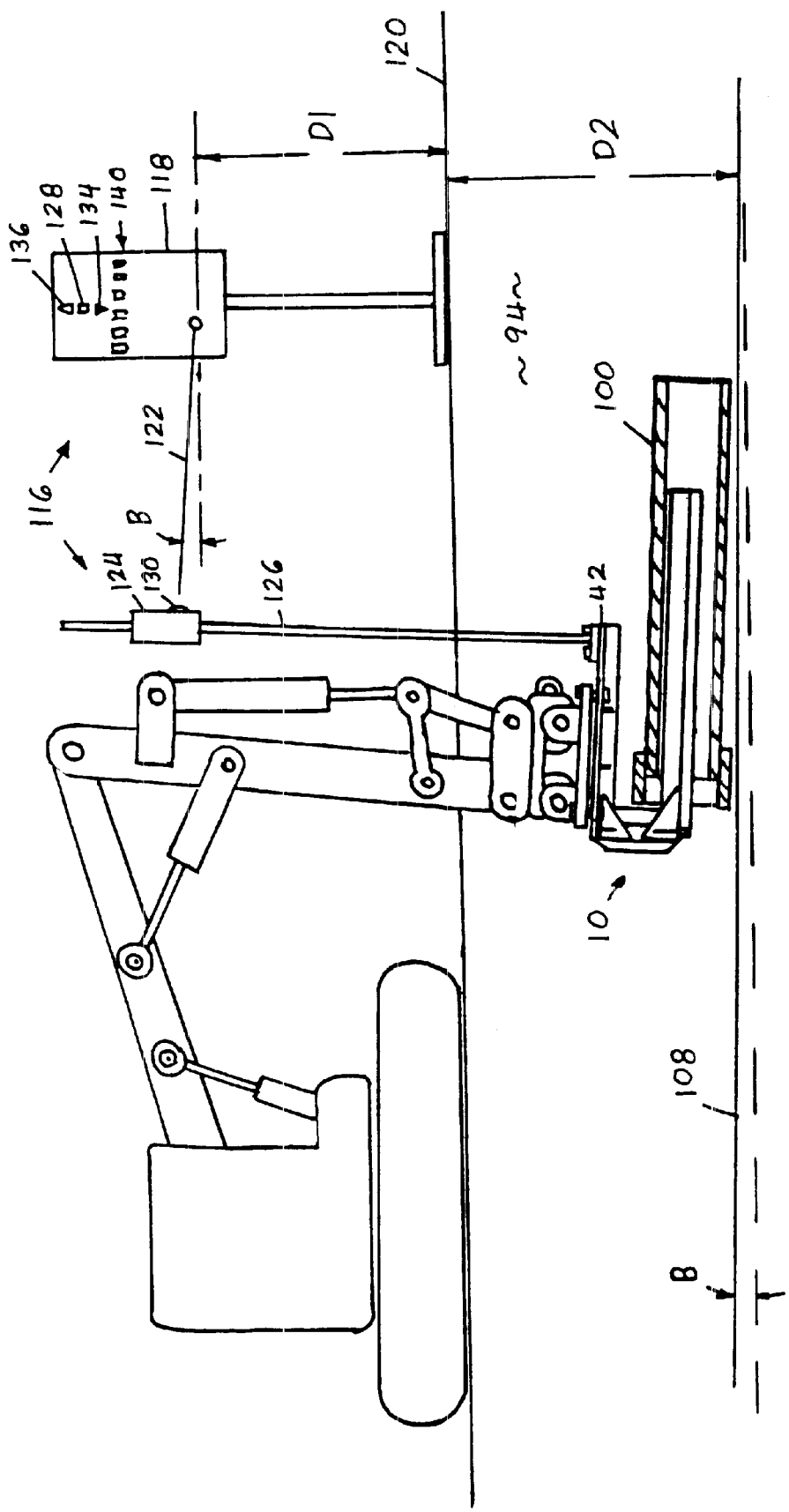
FIG. 4 illustrates the use of the tool in combination with an excavator and positioning device for laying a section of pipe in a trench.

Referring to FIG. 4, according to the preferred embodiment of the method and apparatus of the present invention, the tool 10 is accompanied by a laser positioning apparatus 116. An example of such an apparatus is a device called a Depth Master, manufactured by a company known as Laser Alignment. The apparatus includes a laser transmitter 118 positioned a distance D1 above surface 120 and adjusted to transmit a reference laser beam 122 at the required slope B. A laser receiver 124 is slideably attached to a pole 126 shown attached to the tool 10 plate 42.

The transmitter 118 has a light 128 that turns on when the beam 122 is intercepted by the receiver 124 detector 130. If the detector 130 is below the line 122, a light 134 turns on, and if the detector is above the beam 122, light 136 turns on. In operation, the transmitter 118 is adjusted so that the beam 122 is at an angle B equal to the desired slope of the pipe and trench bottom 108. FIG. 4 shows a preferred method of adjusting the receiver 124 position on the pole 126 so that when pipe 92 arrives at the proper depth, the light 128 goes on. This is done by lowering a section of pipe 100 into the trench 94 until the pipe 100 just contacts the bottom 108. The receiver 124 is then positioned on the pole 126 so that beam 122 is intercepted by the receiver detector 130. The excavator and tool are then used to lay pipe as follows: Assume pipe 100 is laid in position as shown and a second pipe section is picked up by the tool 10. The excavator is backed up with the second pipe so that when it is lowered it will clear pipe 100. It is then lowered into the trench until the light 128 goes on. The excavator then moves forward with the second pipe, adjusting as required to keep the light 128 on, assuring that the second pipe is in alignment with pipe 100, and allowing the second pipe to join properly with pipe 100. In other words, the distance from the beam to the bottom of the trench is a constant, and the depth measurement equipment assures that the pipe is at that depth when the excavator operator attempts to join the two pipe sections together. The transmitter 118 has a second set of lights 140 that gives the operator a visual indication of the vertical alignment of the receiver 124 and therefore pole 126. As used in the present invention, this vertical alignment indicator 140 indicates to an excavator operator whether or not a pipe being held by the tool 100 is in a horizontal, or near horizontal position since the slope B is generally very small, as required for proper mating with a previously laid section of pipe.

Other depth measuring apparatus are also included in the spirit of the present invention. For example, an apparatus using encoders is available. The positioning of the tool arm 14 relative to a reference such as bottom level 108 is determined by the position detection apparatus which includes a processor and monitor for calculating and displaying the position. The calculation is based on signals received from encoders located on the excavator boom assembly to detect the assembly position. The encoders and position monitoring equipment are currently known in the art and applied for positioning shovels mounted on the working end of an excavator arm assembly. The technology of depth detection can be applied to the positioning of a section of pipe as explained above. It is apparent then, that those skilled in the art will know how to apply the technology to measure the depth of the pipe according to the present invention after reading the present disclosure, and a detailed description of the prior art apparatus and how it is used is therefore not included.

Figure 5:
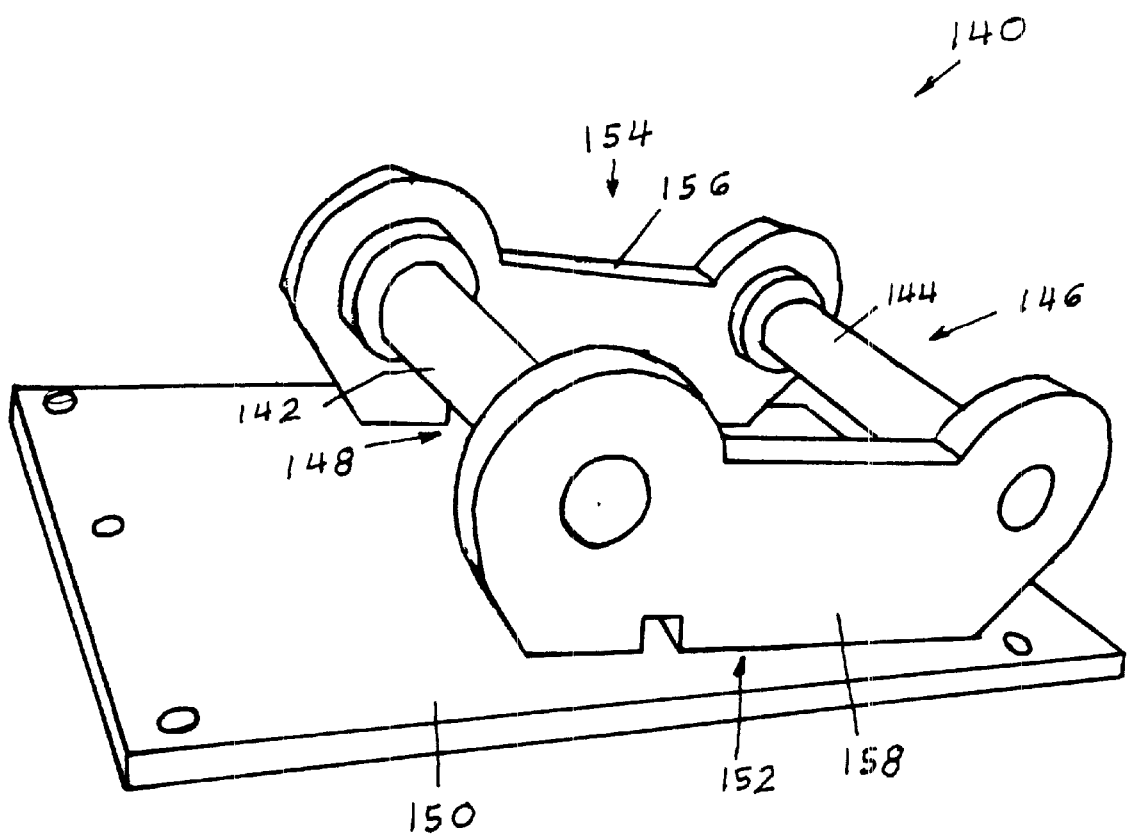
FIG. 5 is a perspective view of a preferred construction of the coupling connector of FIG. 1 indicating enhanced side support for the connector loops.

FIG. 5 is a perspective view of a coupling connector 140 with two rods 142 and 144 forming loops 146 and 148 with the base 150 and side supports 152 and 154, similar to the structure shown in FIG. 1, etc. except that the supports 50 of FIG. 1 are not interconnected with the added support material 156 and 158 in FIG. 5.

Figure 6:
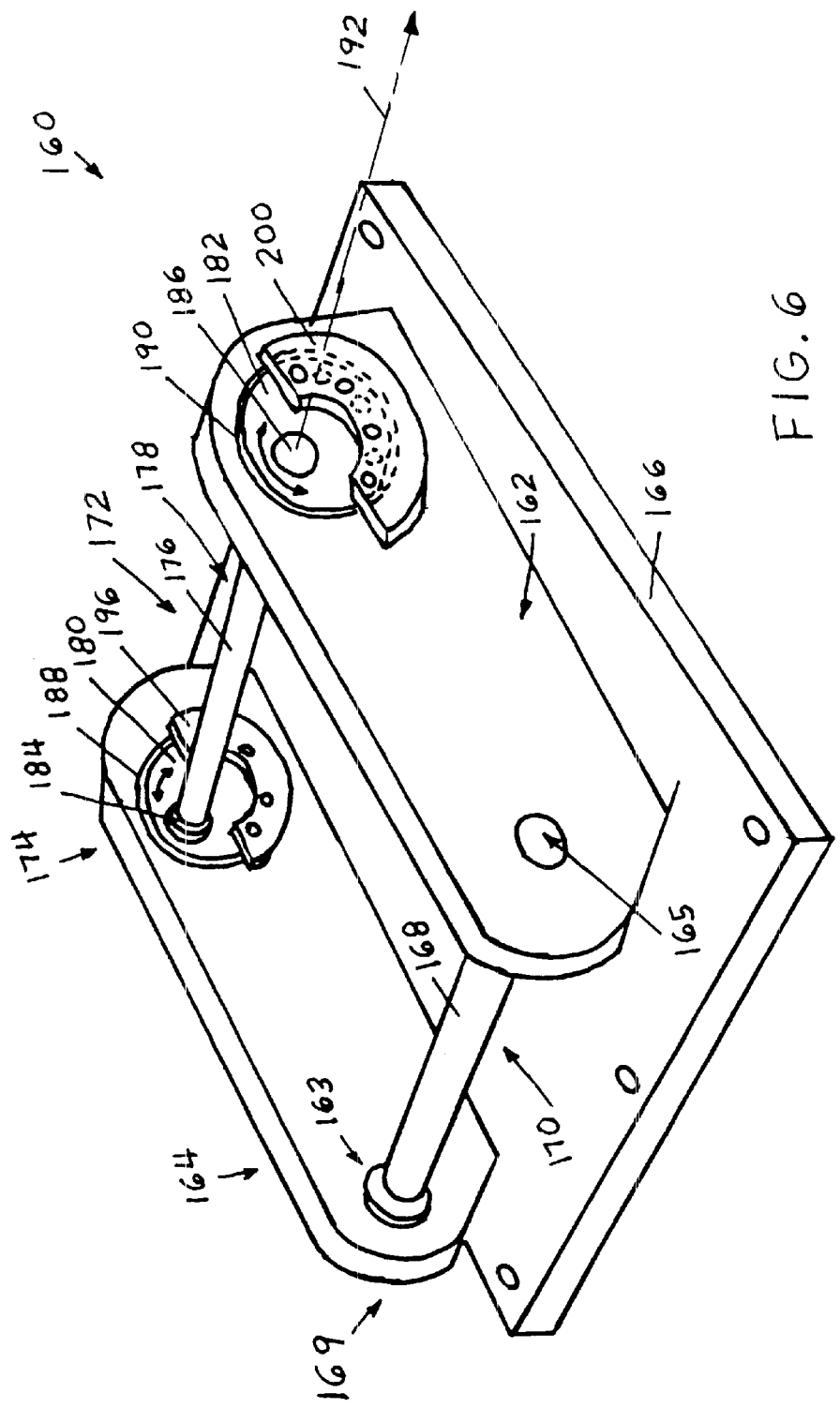
FIG. 6 is a perspective view of an adjustable quick coupling connector.

FIG. 6 is a perspective view of an adjustable coupling connector 160. Parallel first and second side supports 162 and 164 are attached to a first side of a base 166, preferably by welding, and at a first end 169 support first and second ends 163 and 165 of a first rod 168 above the base 166. The ends 163 and 165 are preferably welded to the corresponding supports 164 and 162. The rod 168 with supports 162 and 164 and base 166 form a loop 170, allowing engagement with a corresponding coupling member of an excavator. An adjustable assembly 172 is positioned near a second end 174 of the supports 162 and 164, allowing a second rod 176 to be adjustable in position relative to the first rod 168 and thereby allowing accommodation of various excavator coupling apparatus. The second rod 176 is suspended over the base 166 by supports 162 and 164 forming a second loop 178, and together with rod 168 provide engagement with the coupling apparatus of an excavator. The adjustable assembly 172 includes the second rod 176 attached (preferably welded) at each of first and second rod ends 184 and 186 to first and second circular plates 180 and 182 respectively. The first and second rod ends 184 and 186 are attached to corresponding first and second plates 180 and 182 at a point that is off of the center of each of the first and second plates so as to provide lateral movement i.e., movement relative to rod 168 as the circular plates 180 and 182 are rotated.

Circular plates 180 and 182 are mounted in corresponding first and second circular holes 188 and 190 respectively that are formed in support plate apparatus, shown as the support plates 164 and 162. The sub-assembly including rod 176 and circular plates 180 and 182 is held in position along the direction of the rod axis 192 by axial restraining apparatus illustrated as first side plate apparatus, illustrated as side plates 194, 196, and second side plate apparatus illustrated as side plates 198 and 200, attached (preferably welded) to the supports 162 and 164. Side plates 194 and 198 are not visible in the perspective view of FIG. 6, but are shown in the planar top view of FIG. 7. The circular plates 180 and 182, and the side plates 194–200 all have holes. Holes 222, 224, 226 and 228 in side plates 196 and 200 are visible in the view of FIG. 6. The holes in the circular plates are shown in FIG. 8b. Because the rod 176 is mounted off of the center of circular plate 180 and 182, as the plates are rotated the rod 176 moves in an arc, toward or away from rod 168 as well as moving in a vertical direction. In order to adjust the distance between rods 168 and 176, the circular plates 180 and 182 are rotated. The holes in the circular plates 180 and 182 and the holes in the side plates 194–200 are configured/positioned so that the rod 168 to rod 176 spacing can be selected by aligning specific selected holes in plates 180 and 182 with specific holes in side plates 194–200. A bolt is then inserted through the aligned holes in order to secure the position of rod 176. This operation will be described in reference to FIGS. 8a–8c for a specific set of parameters as an example. The present invention includes any set of parameters/dimensions, and also includes other constructions for varying the spacing between rods 168 and 176 that will be apparent to those skilled in the art from reading the present disclosure. The bolts for securing the position are not shown in FIG. 6, but are shown in FIG. 7.

Figure 7:
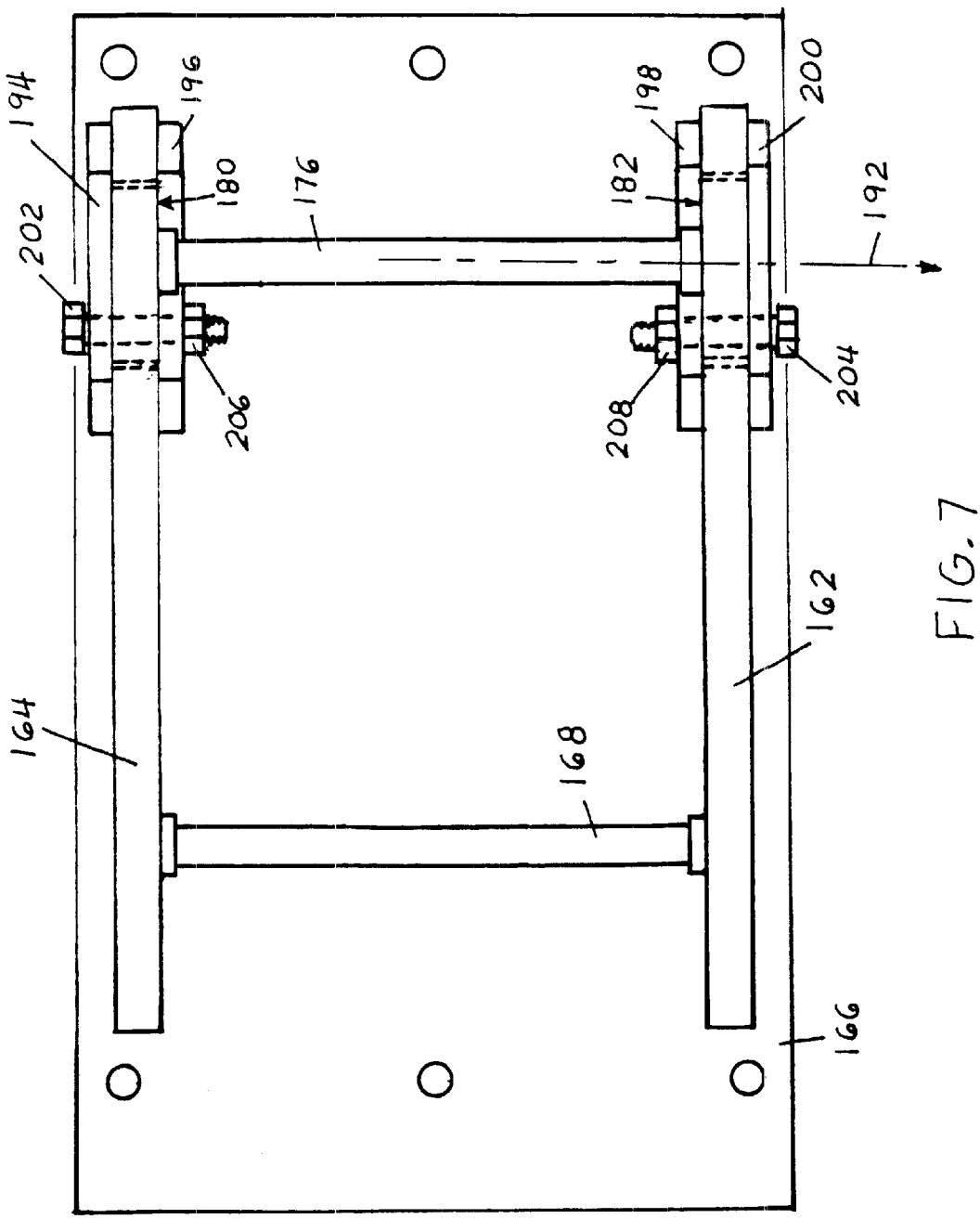
FIG. 7 is a top planar view of the adjustable connector of FIG. 6.

FIG. 7 is a planar top view of the adjustable connector 160 of FIG. 6. FIG. 7 shows the side plates 194, 196, 198 and 200 fully captivating the circular plates 180 and 182 from movement in the direction of the axis 192 of the rod 176. Rotational movement of the circular plates 180 and 182 is prevented by rotational restraining apparatus when they are in a desired position with at least one hole in each of the circular plates 180 and 182 lining up with a corresponding hole in each of the plates 194, 196, 198 and 200, by insertion of a first bolt 202 and a second bolt 204 through the lined-up holes in the circular plates 180 and 182 with the selected holes in side plates 194, 196, 198 and 200. The bolts 202 and 204 are secured by corresponding first and second nut 206 and 208 respectively. Other methods and apparatus for securing the circular plate 180 and 182 will be apparent to those skilled in the art, and these are also included in the spirit of the present invention. Also, other methods and apparatus for adjustably positioning two rods relative to each other will be apparent to those skilled in the art upon reading the present disclosure, and these are also to be included in the spirit of the present invention.

Detailed dimensions of a preferred embodiment of a support plate 162 and 164, circular plates 180 and 182, and side plates 194–200 are shown in the planar view of FIGS. 8a, 8b and 8c. In FIG. 8a, hole 210 is machined to accept a dimension of the rod 168. Hole 212 is dimensioned to slideably receive the circular plate such as plates 180 and 182, and as illustrated plate 214 of FIG. 8b.

In FIG. 8b, the circular plate 214 has a hole 215 offset from a pivot axis point which is the center of the plate 214 for acceptance of one end of rod 176 to which it is preferably welded. Holes 216, 218 and 220 are dimensioned for passage of a bolt such as bolt 202 or 204. The locations of holes 216, 218 and 220 are designed to place the rod 176 a desired distance from rod 168 when aligned with a corresponding location of a specific one of holes 222, 224, 226 or 228 in the side plate 230 of FIG. 8c. The use of a plurality of holes such as 216–220 in the circular plate 214 and a plurality of holes in the side plate 230 allows the holes in the side plate, for example, to be spaced further apart than what would be required if only one hole was used in the circular plate 214 in order to achieve the range of adjustability required. The larger spacing of holes results in a connector with superior strength, which is an important factor in a connector which must handle very heavy loads. With hole 216 of circular plate 214 in alignment with hole 222 of plate 230, the spacing between rods 168 and 176 is 18 inches. With hole 218 in alignment with hole 224 the spacing is 19 inches. With hole 218 in alignment with hole 226 the spacing is 17½ inches, and with hole 220 aligned with hole 228, the spacing is 18¾ inches.

Figure 9:
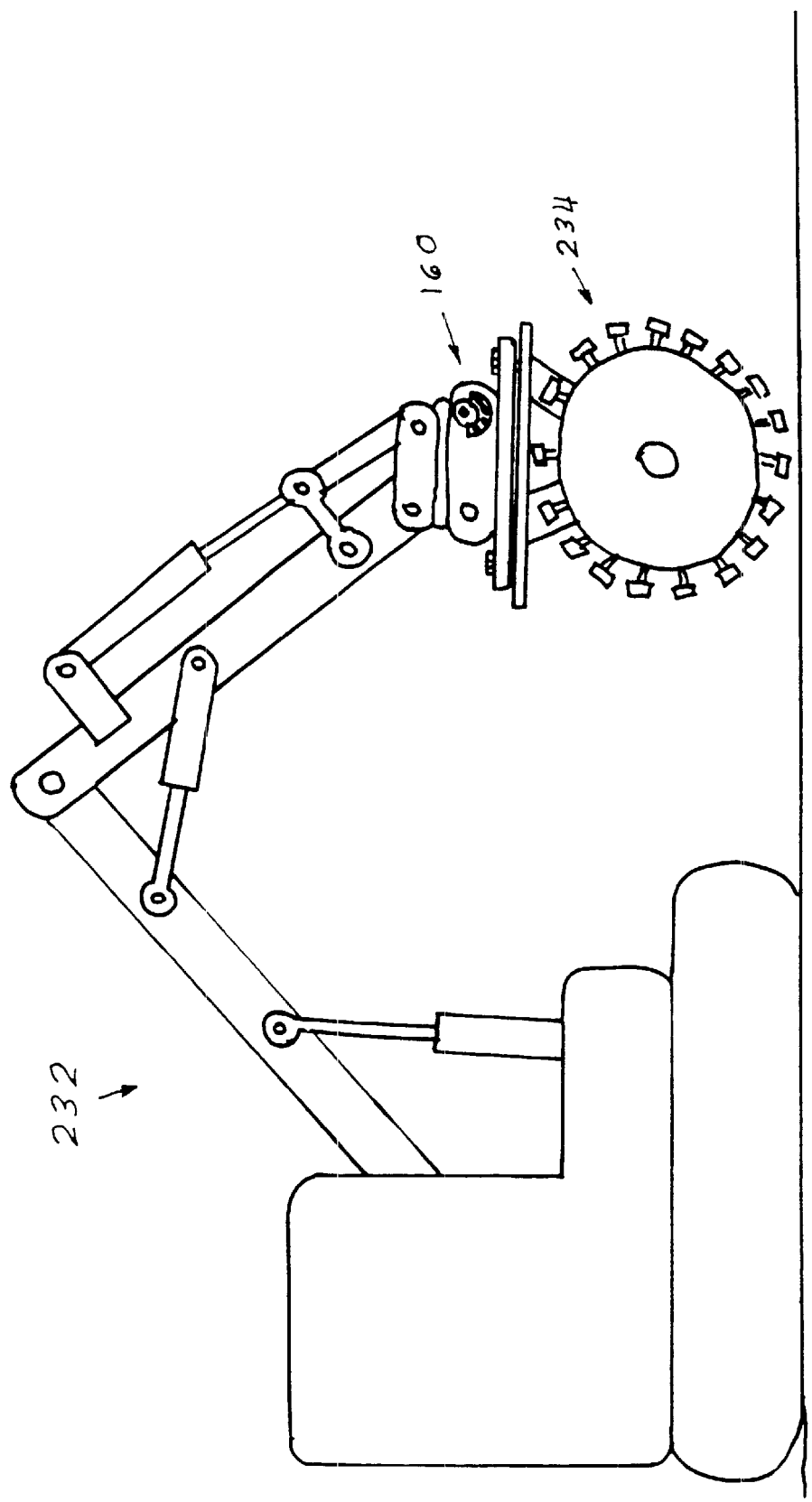
FIG. 9 shows a connector in use with a compaction wheel attached to an excavator.

The connector of FIGS. 6 and 7 can be used with any of various heavy equipment requiring coupling to a tool. In particular, the connector of FIGS. 6–8 can be used as illustrated in FIG. 1 for coupling to a pipe laying tool. FIG. 9 shows the connector 160 providing coupling between an excavator 232 and a compaction wheel 234. The connector 160 can also connect to a pipe laying tool such as to the support plate 42 of the tool shown in FIG. 1 instead of the compaction wheel 234.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

It is claimed that:

1. An adjustable coupling connector for coupling a tool to an excavator, said connector comprising:

(a) a base for attachment to said tool;

(b) a first rod suspended in a fixed position relative to said base;

(c) an adjustable rod assembly having a second rod and an adjustment apparatus for adjustably positioning said second rod a selected distance from said first rod, wherein said adjustment apparatus includes (i) a first circular plate attached to a first end of said second rod at a position off of a center of said first circular plate;

(ii) a second circular plate coaxially disposed to said first circular plate and attached to a second end of said second rod; and (iii) plate support apparatus for rotatably mounting said first and second circular plates, wherein said support apparatus includes a first support plate extending from said base and having a hole therethrough for rotatably supporting said first circular plate, and a second support plate extending from said base and having a hole therethrough for rotatably supporting said second circular plate, a first side plate apparatus attached to said first support plate and covering a portion of said hole in said first support plate so as to retain said first circular plate within said hole in said first support plate, a second side plate apparatus attached to said second support plate and covering a portion of said hole in said second support plate so as to retain said second circular plate within said hole in said second support plate, wherein said first circular plate has at least one hole therethrough, and said second circular plate has at least one hole therethrough, and said first and second side plate apparatus each have a plurality of holes therethrough and each said hole in said first side plate apparatus is positioned so as to be adjustable with at least one hole in said first circular plate, and each said hole in said second side plate apparatus is positioned so as to be adjustable with at least one hole in said second circular plate.

2. An apparatus as recited in claim 1 wherein said adjustment apparatus further includes first bolt apparatus for insertion through a selected said hole in said first side plate apparatus and through an aligned said hole in said first circular plate so as to restrain said first circular plate from rotation.

3. An apparatus as recited in claim 2 wherein said adjustment apparatus further includes second bolt apparatus for insertion through a selected said hole in said second side plate apparatus and through an aligned said hole in said second circular plate so as to restrain said second circular plate from rotation.

* * * * *